United States Patent
Schober et al.

(10) Patent No.: US 11,057,742 B2
(45) Date of Patent: Jul. 6, 2021

(54) METHODS FOR FACILITATING A RELATIVE POSITION DETERMINATION

(71) Applicant: NXP B.V., Eindhoven (NL)

(72) Inventors: Michael Schober, Graz (AT); Ghiath Al-kadi, Graz (AT); Derek Park, Fremont, CA (US)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 16/748,043

(22) Filed: Jan. 21, 2020

(65) Prior Publication Data

US 2020/0245101 A1 Jul. 30, 2020

(30) Foreign Application Priority Data

Jan. 24, 2019 (EP) ..................................... 19153482

(51) Int. Cl.
*H04W 4/029* (2018.01)
*G01S 5/02* (2010.01)

(52) U.S. Cl.
CPC ........... *H04W 4/029* (2018.02); *G01S 5/0284* (2013.01)

(58) Field of Classification Search
None
See application file for complete search history.

(56) References Cited

U.S. PATENT DOCUMENTS

| 7,579,988 | B2 | 8/2009 | Xu et al. |
| 8,040,279 | B2 | 10/2011 | Jo |
| 8,723,729 | B2 | 5/2014 | Desai et al. |
| 2011/0199263 | A1 | 8/2011 | Kang et al. |
| 2015/0362581 | A1* | 12/2015 | Friedman .............. G01S 5/0289 455/456.1 |
| 2016/0370450 | A1* | 12/2016 | Thorn ....................... G01S 3/46 |
| 2019/0037350 | A1* | 1/2019 | Prevatt .................. H04W 4/023 |

* cited by examiner

*Primary Examiner* — Adolf Dsouza (57) ABSTRACT

A method for facilitating a relative position determination is disclosed, comprising: a first radio frequency (RF) communication device measures a first angle of arrival, being an angle of arrival of a first RF signal received from a second RF communication device; the first RF communication device senses its orientation at a first time, resulting in a first orientation; the first RF communication device measures a second angle of arrival, being an angle of arrival of a second RF signal received from the second RF communication device; the first RF communication device senses its orientation at a second time, resulting in a second orientation; the relative position of the second RF communication device with respect to the first RF communication device is determined using a difference between the first angle of arrival and the second angle of arrival and a difference between the first orientation and the second orientation.

16 Claims, 6 Drawing Sheets

METHODS FOR FACILITATING A RELATIVE POSITION DETERMINATION

CROSS-REFERENCE TO RELATED APPLICATIONS

This application claims priority under 35 U.S.C. § 119 to European Patent Application No. 19153482.5, filed on Jan. 24, 2019, the contents of which are incorporated by reference herein.

TECHNICAL FIELD

The present disclosure relates to methods for facilitating a relative position determination. Furthermore, the present disclosure relates to corresponding computer programs, and to a corresponding radio frequency (RF) communication device.

BACKGROUND

Radio frequency (RF) communication networks, such as ultra-wideband (UWB) communication networks, Bluetooth communication networks, Zigbee communication networks, and Wi-Fi communication networks, are often used to determine the two-dimensional or three-dimensional position of a node, for example in a building or another structure. In general, a network node's position should be determined quickly and accurately, without requiring a lot of processing resources.

SUMMARY

In accordance with a first aspect of the present disclosure, a method for facilitating a relative position determination is conceived, comprising: a first radio frequency (RF) communication device measures a first angle of arrival, being an angle of arrival of a first RF signal received from a second RF communication device; the first RF communication device senses its orientation at a first time, resulting in a first orientation; the first RF communication device measures a second angle of arrival, being an angle of arrival of a second RF signal received from the second RF communication device; the first RF communication device senses its orientation at a second time, resulting in a second orientation; the relative position of the second RF communication device with respect to the first RF communication device is determined using a difference between the first angle of arrival and the second angle of arrival and a difference between the first orientation and the second orientation.

In an embodiment, the first angle of arrival and the first orientation are measured, respectively sensed, at substantially the same time, and the second angle of arrival and the second orientation are measured, respectively sensed, at substantially the same time.

In an embodiment, the difference between the first angle of arrival and the second angle of arrival is correlated with the difference between the first orientation and the second orientation, and the first angle of arrival is confirmed if the result of said correlation matches an expected correlation result.

In an embodiment, the method further comprises requesting a user to change the orientation of the first RF device after the first RF communication device has sensed its orientation the first time.

In an embodiment, the first orientation and the second orientations are absolute orientations or relative orientations.

In an embodiment, the first orientation and the second orientation are sensed by an angular rate sensor of the first RF communication device.

In an embodiment, the angular rate sensor is included in an inertial measurement unit of the first RF communication device.

In an embodiment, the first and second RF communication devices are ultra-wideband (UWB) communication devices, Bluetooth communication devices, Zigbee communication devices, or Wi-Fi communication devices.

In accordance with a second aspect of the present disclosure, a computer program is provided, comprising computer-executable instructions that, when executed, carry out or control a method of the kind set forth.

In accordance with a third aspect of the present disclosure, a radio frequency (RF) communication device is provided, comprising: a measurement unit configured to measure an angle of arrival of RF signals received from an external RF communication device; a sensor configured to sense the orientation of the RF communication device; a processing unit; wherein the measurement unit is configured to measure a first angle of arrival and a second angle of arrival; wherein the sensor is configured to sense a first orientation and a second orientation; wherein the processing unit is configured to determine the relative position of the second RF communication device with respect to the first RF communication device using a difference between the first angle of arrival and the second angle of arrival and a difference between the first orientation and the second orientation.

In accordance with a fourth aspect of the present disclosure, a method for facilitating a relative position determination is conceived, comprising: a first radio frequency (RF) communication device measures a first angle of arrival, being an angle of arrival of an RF signal received from a second RF communication device; the first RF communication device senses its orientation, resulting in a first orientation; the second RF communication device measures a second angle of arrival, being an angle of arrival of an RF signal received from the first RF communication device; the second RF communication device senses its orientation, resulting in a second orientation; the relative position of the second RF communication device with respect to the first RF communication device is determined using a difference between the first angle of arrival and the second angle of arrival and a difference between the first orientation and the second orientation.

In an embodiment, the first angle of arrival and the first orientation are measured, respectively sensed, at substantially the same time, and the second angle of arrival and the second orientation are measured, respectively sensed, at substantially the same time.

In an embodiment, the first orientation and the second orientations are absolute orientations.

In an embodiment, the first orientation and the second orientation are sensed by an angular rate sensor of the first RF communication device, respectively an angular rate sensor of the second RF communication device.

In accordance with a fifth aspect of the present disclosure, a computer program is provided, comprising computer-executable instructions that, when executed, carry out or control a method in accordance with the fourth aspect.

DESCRIPTION OF DRAWINGS

Embodiments will be described in more detail with reference to the appended drawings, in which.

DESCRIPTION OF EMBODIMENTS

Radio frequency (RF) communication networks, such as ultra-wideband (UWB) communication networks, Bluetooth communication networks, Zigbee communication networks, and Wi-Fi communication networks, are often used to determine the two-dimensional or three-dimensional position of a node, for example in a building or another structure. In general, a network node's position should be determined quickly and accurately, without requiring a lot of hardware and processing resources.

Determining the position of one node relative to another node often involves an angle-of-arrival measurement: this means that a first node measures the angle of an incoming signal that is received by multiple antennas of said node. Based on the phase of the received signal, more specifically the difference in the phase of the signal received at different antennas, the angle of arrival is determined, and thereby the relative position of the node that transmits the signal. Unfortunately, using only two antennas for determining the angle-of-arrival is not always accurate, because symmetric angles cannot be properly distinguished, as a result of which the transmitting devices can be at two different positions, which cannot be distinguished from each other. To avoid this ambiguity, at least one third antenna should be used. This, in turn, adds cost to the network nodes. Now discussed are methods, devices and systems for facilitating a relative position determination, in particular for resolving said ambiguity without requiring a lot of resources (e.g. an additional antenna).

Figure 1:
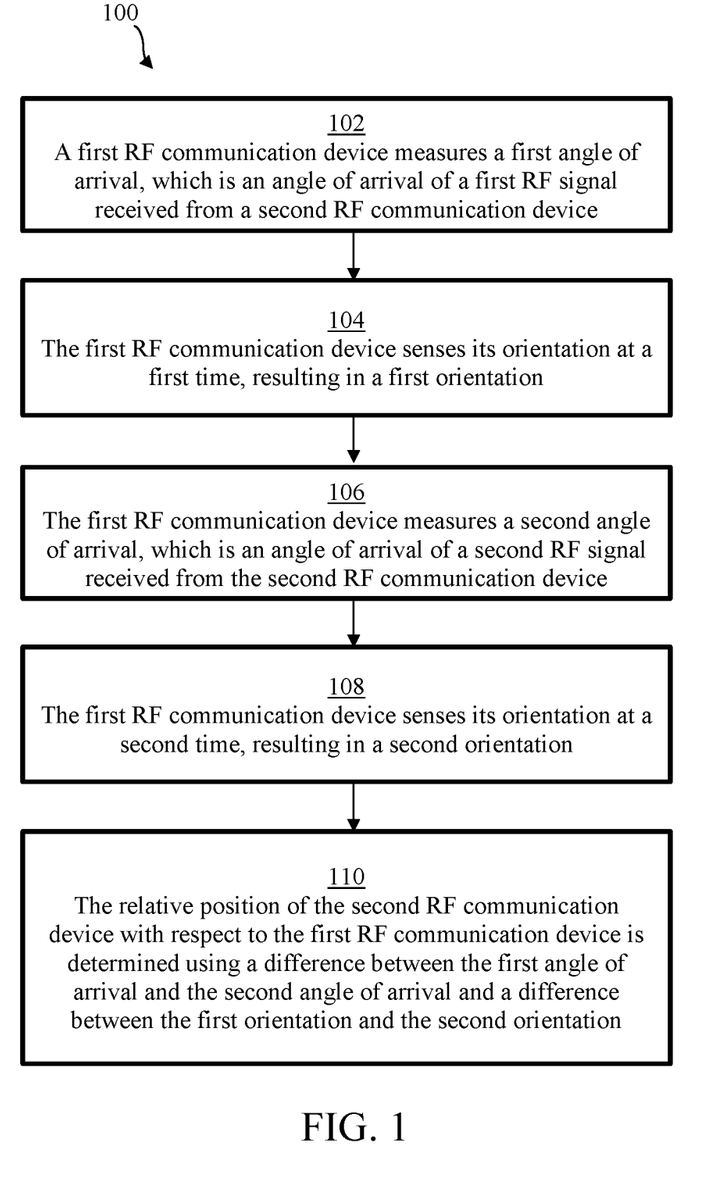
FIG. 1 shows an illustrative embodiment of a method for facilitating a relative position determination.

FIG. 1 shows an illustrative embodiment of a method 100 for facilitating a relative position determination. The method 100 comprises the following steps. At 102, a first RF communication device measures a first angle of arrival, which is an angle of arrival of a first RF signal received from a second RF communication device. At 104, the first RF communication device senses its orientation a first time, resulting in a first orientation. At 106, the first RF communication device measures a second angle of arrival, which is an angle of arrival of a second RF signal received from the second RF communication device. At 108, the first RF communication device senses its orientation a second time, resulting in a second orientation. Furthermore, at 110, the relative position of the second RF communication device with respect to the first RF communication device is determined using the difference between the first angle of arrival and the second angle of arrival and the difference between the first orientation and the second orientation. For instance, the receiving node can confirm that the first angle of arrival is correct based on said difference between the first angle of arrival and the second angle of arrival and said difference between the first orientation and the second orientation. If the first angle of arrival is correct, then the first angle of arrival can be used to determine the relative position of the second RF communication device with respect to the first RF communication device. Thus, in other words, the aforementioned ambiguity can be resolved. In particular, by adding data regarding the orientation of the receiving node to the angle-of-arrival measurement data, the receiving node can remove the ambiguity of the angle of arrival measurement. The orientation data are an example of inertial measurement data. The method may, at least partially, be carried out or controlled by means of a computer program.

Figure 2:
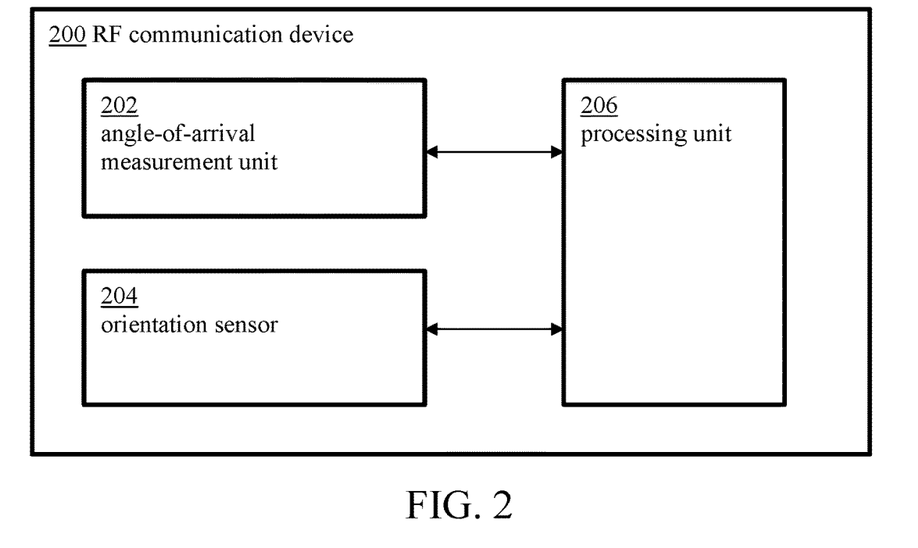
FIG. 2 shows an illustrative embodiment of an RF communication device.

FIG. 2 shows an illustrative embodiment of an RF communication device 200. The RF communication device is configured to carry out the steps of the method 100 shown in FIG. 1. The RF communication device 200 comprises an angle-of-arrival measurement unit 202, an orientation sensor 204, and a processing unit 206 operatively coupled to the angle-of-arrival measurement unit 202 and the orientation sensor 204. The angle-of-arrival measurement unit 202 is configured to measure an angle of arrival of RF signals received from an external RF communication device (not shown). Both the RF communication device 200 and the external RF communication device can act as network nodes, for example in an UWB communication network. The orientation sensor 204 is configured to sense the orientation of the RF communication device 200. More specifically, the angle-of-arrival measurement unit 202 is configured to measure a first angle of arrival and a second angle of arrival, and the orientation sensor 204 is configured to sense a first orientation and a second orientation. Furthermore, the processing unit 206 is configured to determine the relative position of the external RF communication device with respect to (i.e., relative to) the RF communication device 200 using the difference between the first angle of arrival and the second angle of arrival and the difference between the first orientation and the second orientation. For this purpose, the processing unit 206 may receive the first angle of arrival and second angle of arrival from the angle-of-arrival measurement unit 202 and the first orientation and second orientation from the orientation sensor 204 and compute the differences, for example. In a practical and effective implementation, the orientation sensor 204 is an angular rate sensor. Furthermore, in a practical and effective implementation, the angular rate sensor is included in an inertial measurement unit. Since some types of network nodes, for example smart phones, may already contain an inertial measurement unit, no separate orientation sensor 204 needs to be provided, thereby further saving resources. Accordingly, the first orientation and the second orientations may be absolute orientations or relative orientations, as sensed by an angular rate sensor of the kind set forth. In this context, "relative" means that there is no angle reference such as the magnetic north pole. A relative movement means that a rotation is tracked e.g. 20° clock wise, but that the actual orientation is unknown because of a missing magnetometer in the inertial sensor system. If relative orientations are also sufficient for resolving the ambiguity, then the system does not need a magnetometer, which is an advantage from a cost and stability perspective.

Figure 3:
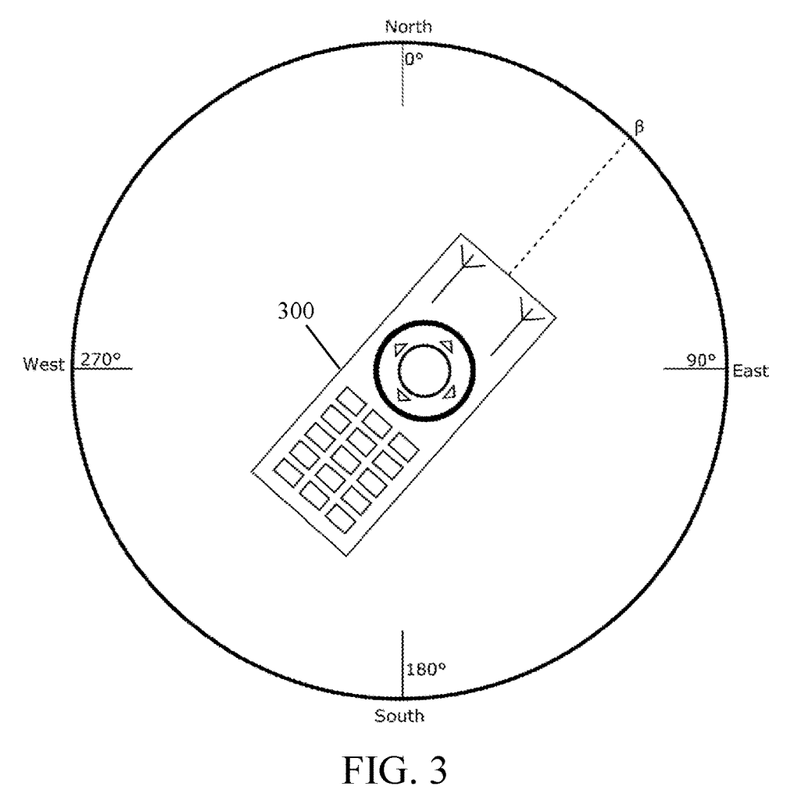
FIG. 3 shows an example of an RF communication device.

FIG. 3 shows an example of an RF communication device 300. In particular, the RF communication device 300 is a remote-control unit having an embedded inertial measurement unit (IMU). The IMU is configured to determine movements of the remote-control unit. An inertial measurement unit often includes three different types of sensors: an angular rate sensor, a magnetometer, and an accelerometer. The angular rate sensor is able to sense the device's orientation, more specifically to track its rotatory movement. For instance, the angular rate sensor may be used to recognize fast rotatory accelerations. The accelerometer is capable of measuring linear accelerations. The magnetometer is used for determining the orientation of the device in comparison to the magnetic field of the earth; this orientation may be useful for determining the direction of the gravitation force. Also, it may be important to have the magnetometer for compensating the drift of the angular rate sensor: without the magnetometer the measurement inaccuracy of the angular rate sensor would integrate over time which means the absolute orientation of the device would be difficult to determine. For that reason, the magnetometer may be used for having a reference measurement which doesn't drift, due to the static magnetic field. Basically, only the magnetometer would be sufficient for determining the orientation of the remote-control unit, but because of the low maximum measurement repetition frequency of the magnetometer the angular rate sensor may be used for making more dynamic measurements with the previous magnetometer measurement as a reference. However, if not much time has elapsed between sensing the first orientation and the second orientation, the drift of the angular rate sensor can be neglected, and accordingly a magnetometer may not be needed.

In theory, a linear acceleration sensor combined with an angular rate sensor would be able to determine the position of an IMU in three-dimensional space. If the start position and speed of the IMU is known the acceleration measurement could be integrated twice which would lead to a distance, wherein the integration constants are the initial position and the initial speed of the IMU. In practice, however, the acceleration sensor does also have a measurement error which also integrates over time. The only difference in comparison to the angular rate sensor is that the acceleration is integrated twice, which means the drift is much stronger. Also, the drift of the position can't be compensated with the magnetometer because the magnetometer gives no information about the current three-dimensional position of the IMU. In view thereof, a system that only contains an IMU is unsuitable for, for instance, indoor navigation/tracking systems, where a high accuracy is needed over a long time. FIG. 3 shows how the orientation of the remote-control unit can be measured in this scenario: the north pole is the reference point for the angular measurement, and the angle 3 is the measured orientation of the IMU inside the remote-control unit in comparison to the north pole. It is noted that, although FIG. 3 shows the scheme of an angle measurement around one particular axis, the angle measurement around other axes can be done in a similar way.

Ultra-wideband (UWB) communication technology is a pulse-based technology that uses short-time pulses for communication. Short-time pulses can be used for an accurate time-of-flight (TOF) measurement, but also an angle-of-arrival (AOA) measurement can be applied to an UWB signal. In general, AOA measurements use two or more antennas with a known distance (e.g. $\lambda/2$) between each other. By comparing the phase of the signal received at the different antennas, the AOA can be estimated. Unfortunately, however, there is an ambiguity if only two antennas are used: if a signal is mirrored around the antenna-axis a two-antenna based AOA system will measure the same angle for both signals. This is also the case if other RF technologies are used.

Figure 4:
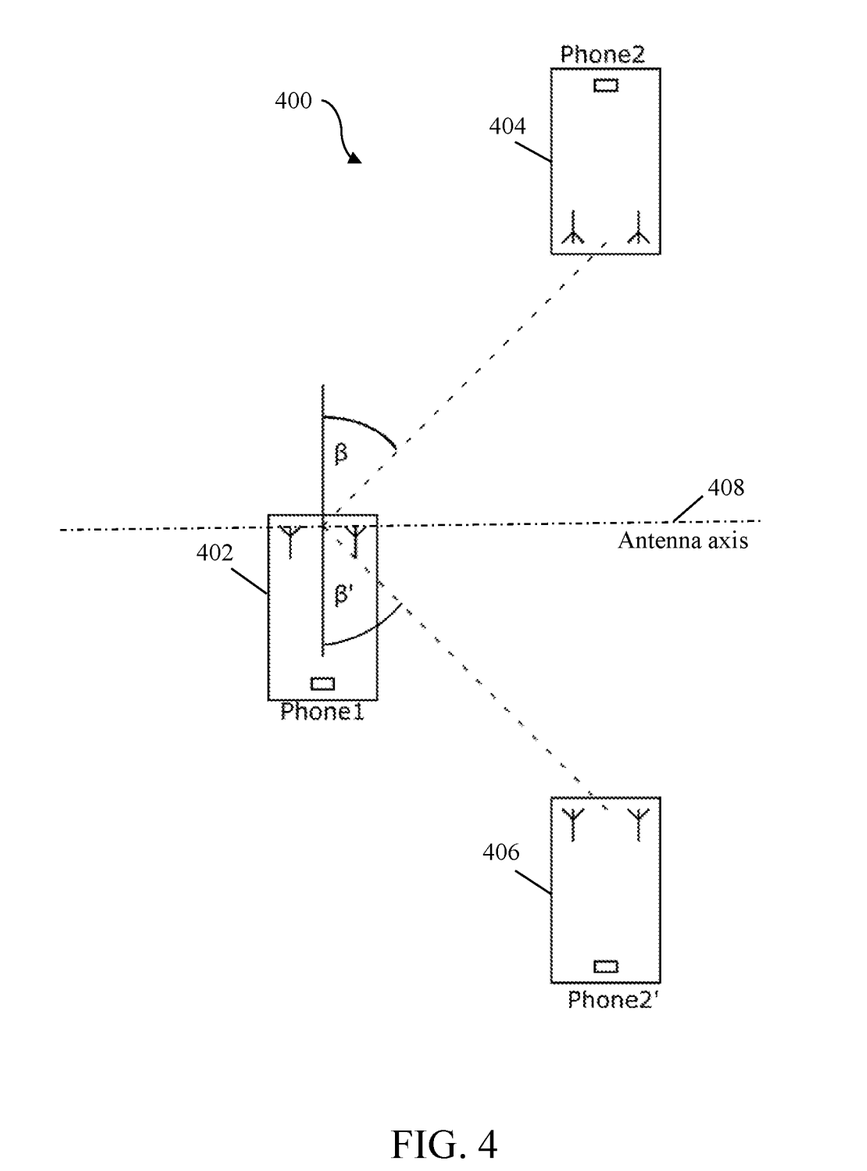
FIG. 4 shows an example of a system for facilitating a relative position determination.

FIG. 4 shows an example of a system 400 for facilitating a relative position determination. In particular, FIG. 4 shows a scenario wherein two phones 402, 404 want to determine their position relative to each other, based on an UWB distance and AOA measurement. For this purpose, the first phone 402 measures the angle-of-arrival of a received signal, i.e. a signal transmitted by a second phone 404. The measured angle is referred to as angle $\beta$. Also, a mirrored position 406 of the second phone 404 is shown. More specifically, position 406 is mirrored around the axis on which the two antennas of the first phone 402 are placed. For determining the relative position of the second phone 404, the first phone 402 should be able to distinguish between a signal originating from the real position of the second phone 404 and the mirrored position 406. Since a signal from the mirrored position 406 would be received under the angle $\beta'$, which is the angle $\beta$ mirrored around the antenna axis, a dual-antenna AOA measurement system cannot distinguish between the angle $\beta$ and the mirrored angle $\beta'$. This ambiguity is caused by the fact that both signals—i.e. a signal originating from the actual position 404 and a signal originating from the mirrored position 406—would have the same phase measurement results. This means that the ambiguity cannot be resolved and that the first phone 402 cannot determine the actual position of the second phone 404 without using additional background data. In accordance with the present disclosure, the orientation of the first phone 402 may be for example be used as additional background data for resolving the ambiguity.

In an embodiment, the first angle of arrival and the first orientation are measured, respectively sensed, at substantially the same time, and the second angle of arrival and the second orientation are measured, respectively sensed, at substantially the same time. In this way, determining the relative positions is further facilitated. Furthermore, the time elapsed between the first event—i.e. measuring the first angle-of-arrival and sensing the orientation at the first time—and the second event—i.e. measuring the second angle-of-arrival and sensing the orientation at the second time—may be sufficiently long for a meaningful distinction in orientation to be made, but short enough to neglect the drift of the orientation sensor, for example. In practical and effective implementation, the method further comprises requesting a user to change the orientation of the first RF communication device after the first RF communication device has sensed its orientation for the first time. This may for example be done through a graphical user interface (GUI) of the RF communication device. Furthermore, in a practical and effective implementation, the difference between the first angle of arrival and the second angle of arrival is correlated with the difference between the first orientation and the second orientation, and the first angle of arrival is confirmed if the result of said correlation matches an expected correlation result. If the first angle of arrival is confirmed, then the ambiguity is effectively resolved, and the relative position of the second RF communication device with respect to the first RF communication device can be determined reliably using the first angle of arrival.

Figure 5A:
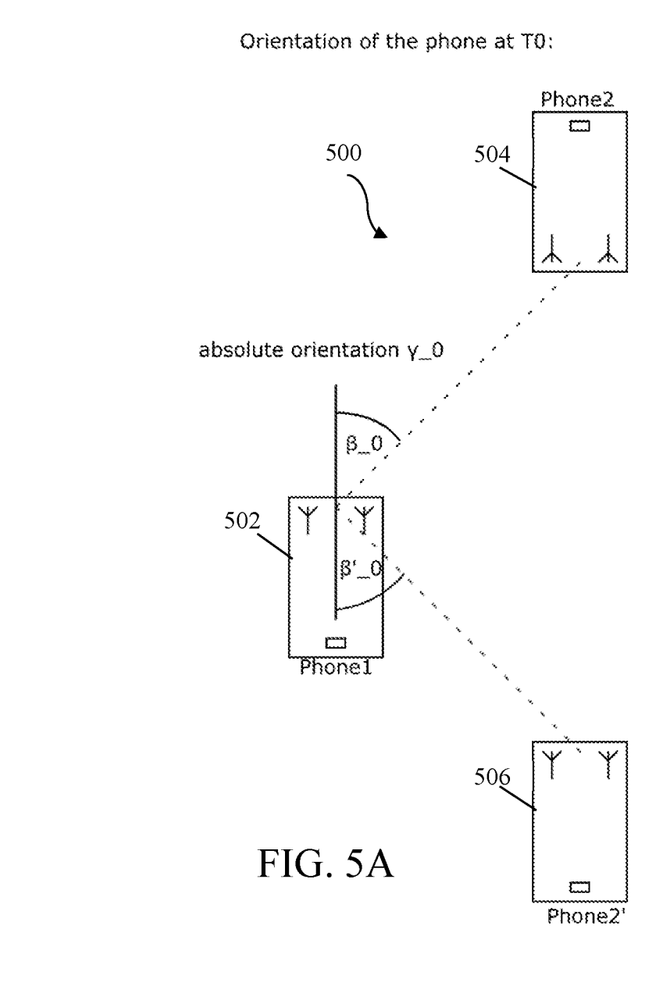
FIG. 5A shows an illustrative embodiment of a system for facilitating a relative position determination.
Figure 5B:
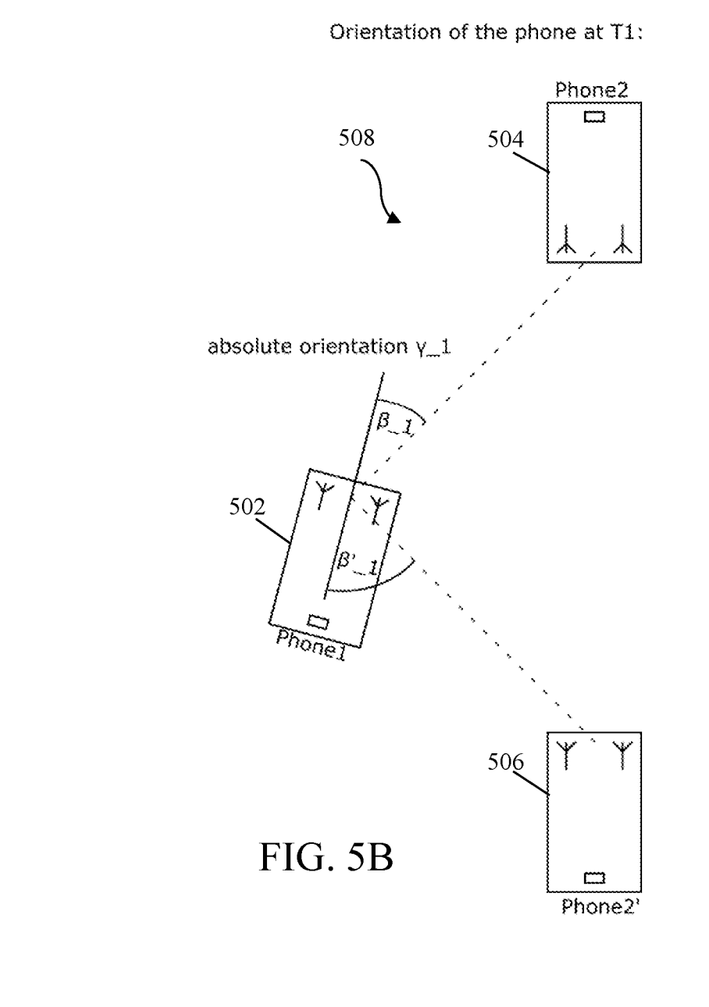
FIG. 5B shows another illustrative embodiment of a system for facilitating a relative position determination.

FIGS. 5A and 5B show illustrative embodiment of systems 500, 502 for facilitating a relative position determination. In particular, FIG. 5A shows a system 500 at a first moment in time (T0), while FIG. 5B shows the system 502 at a second moment in time (T1). In particular, a peer-to-peer communication scenario is shown on two different moments in time, i.e. T0 and T1. The first AOA measurement is performed at time instant T0, resulting in the same AOA measurements as in the scenario shown in FIG. 4. In addition, at time instant T0 the orientation of the first phone 502 is sensed by the IMU. The AOA measured at T0 is $\beta\_0$ and the absolute orientation of the first phone 502 at T0 is $\gamma\_0$. These two pieces of information alone are not sufficient for resolving the ambiguity, because based on these data the second phone 504 (Phone 2) could still have the mirrored position 506 (shown as Phone 2').

However, if a second measurement, respectively sensing operation, is assumed taking place a short time period later, and collect again the AOA and IMU orientation data, the ambiguity can be resolved. In FIG. 5B it is shown that the second data set is obtained at time instant T1. The AOA measurement at T1 results in angle $\beta\_1$, the IMU orientation sensing at T1 results in orientation $\gamma\_1$. The orientation of the first phone 510 has changed from $\gamma\_0$ to $\gamma\_1$ and also the measured AOA has changed because of the orientation change. The calculation of the relative orientation change $\Delta\gamma$ is shown in equation (1) below, and the calculation of the relative AOA change $\Delta\beta$ is shown in equation (2). In case of a sufficiently large distance between the two phones 502, 504, a sufficiently small angle $\beta\_0$, and a sufficiently small amount of time between T0 and T1, it can be assumed that the second phone 504 will not be able switch sides because of the maximum speed a human can achieve. The distance between the two phones 502, 504 can be estimated by performing a time-of-flight (TOF) measurement. This TOF measurement may indicate how reliable the AOA measurement was. The ambiguity can now be resolved by comparing $\Delta\beta$ with $\Delta\gamma$. For instance, according to FIGS. 5A and 5B the change of the orientation is larger than zero (i.e. $\Delta\gamma>0$); this orientation change correlates with the change in the angle of arrival ($\Delta\beta$). If $\Delta\beta<0$ the position of the second phone (Phone 2) is indeed the position 504, but if $\Delta\beta>0$ the actual position of Phone 2 is the mirrored position 506 shown as Phone 2'. Thus, the ambiguity can be resolved by comparing two data sets, wherein each data includes an AOA measurement result and a IMU sensing result (i.e. a sensed orientation). The change in orientation and the change in angle of arrival may be defined by the following equations:

$$\Delta\gamma=\gamma\_1-\gamma\_0 \quad (1)$$

$$\Delta\beta=\beta\_1-\beta\_0 \quad (2)$$

It is noted that, in the example shown in FIGS. 5A and 5B, $\gamma$ increases by a clockwise rotation and decreases by a counterclockwise rotation. However, it should also be noted that the counting directions can switch in the implementation, which will lead to a sign change.

In accordance with the presently disclosed methods, only two antennas are needed for the AOA measurement, which results in lower costs. Although an orientation sensor is needed, such a sensor is already often available in RF communication devices (e.g. smart phones). Accordingly, in many cases no additional hardware is required. In a practical implementation, an application for detecting the position of a phone may e.g. have an initial calibration phase during which a message is displayed instructing a user to change the orientation of the phone, so that the ambiguity can be resolved. Once the ambiguity has been resolved, the relative position of the phone with respect to an external communication device is known. Furthermore, no magnetometer is needed, because only relative orientation changes are compared. For example, in the example shown in FIGS. 5A and 5B, it is only important to know if the orientation change was clockwise or counter-clockwise. Since no magnetometer is needed, the presently disclosed methods become more robust against disturbances. For instance, a magnetic field close to the phone might cause erroneous magnetometer measurements, which would lead to an erroneous position determination. Since the magnetometer is not used and the drift of the angular rate sensor can be neglected for short time measurement periods, external magnetic fields have a negligible effect on the measurement. If both phones 502, 504 measure the AOA of e.g. a two-way message exchange, the phones 502, 504 can resolve the ambiguity by combining the two orientation sensing results with the two AOA measurement results.

Figure 6:
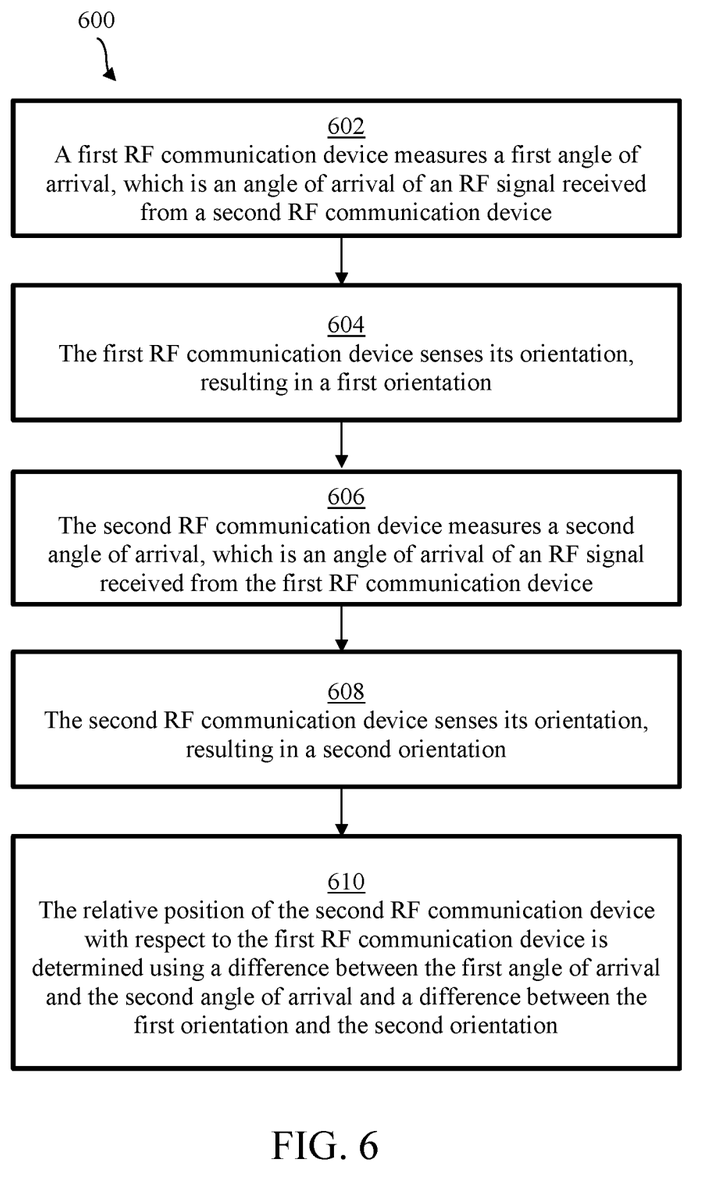
FIG. 6 shows another illustrative embodiment of a method for facilitating a relative position determination.

FIG. 6 shows another illustrative embodiment of a method 600 for facilitating a relative position determination. The method 600 comprises the following steps. At 602, a first RF communication device measures a first angle of arrival, which is an angle of arrival of a first RF signal received from a second RF communication device. At 604, the first RF communication device senses its orientation, resulting in a first orientation. At 606, the second RF communication device measures a second angle of arrival, which is an angle of arrival of an RF signal received from the first RF communication device. At 608, the second RF communication device senses its orientation, resulting in a second orientation. Furthermore, at 610, the relative position of the second RF communication device with respect to the first RF communication device is determined using the difference between the first angle of arrival and the second angle of arrival and the difference between the first orientation and the second orientation. In this way, the aforementioned ambiguity can be resolved. More specifically, by adding data regarding the orientation of the receiving node to the angle-of-arrival measurement data, the receiving node can unambiguously determine the angle of arrival. The orientation data are an example of inertial measurement data. The method may, at least partially, be carried out or controlled by means of a computer program. In particular, FIG. 6 shows an alternative solution for avoiding the ambiguity of the angle-of-arrival measurements. In other words, an alternative method for facilitating a relative position determination is shown. In an embodiment, the first angle of arrival and the first orientation are measured, respectively sensed, at substantially the same time, and the second angle of arrival and the second orientation are measured, respectively sensed, at substantially the same time. In this way, determining the relative positions is further facilitated.

Figure 7:
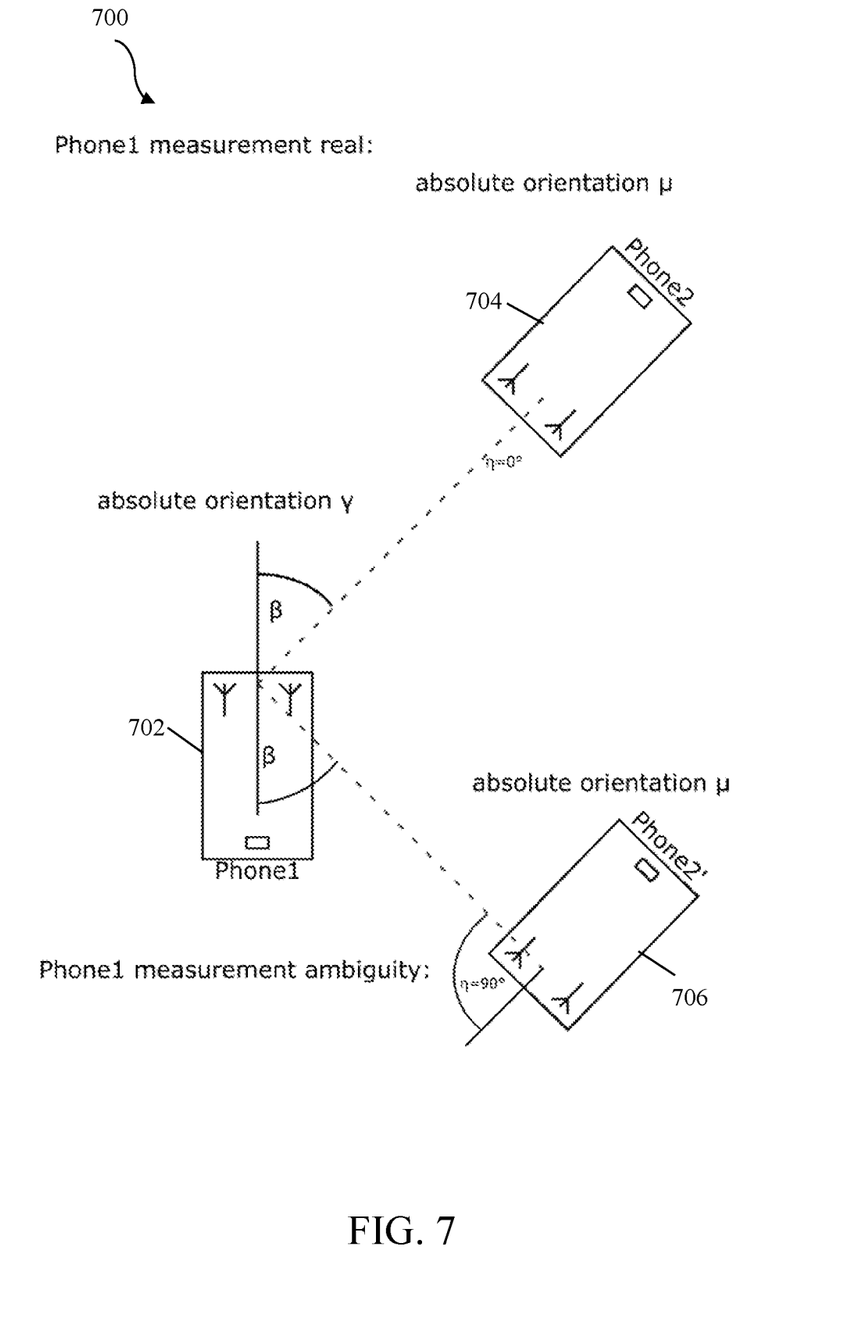
FIG. 7 shows a further illustrative embodiment of a system for facilitating a relative position determination.

FIG. 7 shows a further illustrative embodiment of a system 700 for facilitating a relative position determination. In particular, two RF communication devices 702, 704 are shown (two phones, Phone1 and Phone2), which measure respectively sense their orientation and the AOA of received messages during a message exchange. The first phone 702 senses its orientation $\gamma$ and measures the angle $\beta$. Based on this data set, there are two possible positions 704, 706 of the second phone, referred to as Phone2 and Phone2'. The second phone 704 senses its orientation and measures the angle $\eta$. By combining the AOA measurement with the orientation on both phones the ambiguity can now be resolved. Based on the sensed orientation and measured angle of the first phone 702, two possible positions can be determined, but these two positions result in a different AOA measurement if the orientation of the second phone 704 is considered. In the example shown in FIG. 7, if the measured AOA on the second phone $\eta=0°$, then the actual position of the second phone must be the position 704 referred to as Phone2. However, if the angle $\eta=90°$, then the actual position of the second phone must be the position 706 referred to as Phone2'. Now a decision can be made on the absolute incoming angles of the signals on the two phones.

The calculation of the possible absolute incoming angles of the first phone 702 are shown in equation 3 and equation 3.1, while the calculation of the possible absolute incoming angles of second phone 704 are shown in equation 4 and equation 4.1:

$$\alpha_{Abs_{Phone1}} = \gamma - \beta \tag{3}$$

$$\alpha_{Abs_{Phone1}} = \gamma + \beta - 180° \tag{3.1}$$

$$\alpha_{Abs_{Phone2}} = \mu - \eta \tag{4}$$

$$\alpha_{Abs_{Phone2}} = \mu + \eta - 180 \tag{4.1}$$

Subsequently, by checking if the equation 5 holds within a given tolerance the relative positions of the phones can be determined:

$$\alpha_{Abs_{Phone2}} = \alpha_{Abs_{Phone1}} + 180° \tag{5}$$

Again, it is noted that the counting direction of $\gamma$ in this example is clockwise. This, however, can change in a final implementation. In other words, the equations only illustrate a principle that can be applied to resolve the ambiguity. Furthermore, it is noted that only one match in the equation (5) over the calculated absolute angles is possible. Thus, by checking the matching values of $\alpha_{Abs_{Phone1}}$ and $\alpha_{Abs_{Phone2}}$, the relative positions of the phones can be determined.

The systems and methods described herein may at least partially be embodied by a computer program or a plurality of computer programs, which may exist in a variety of forms both active and inactive in a single computer system or across multiple computer systems. For example, they may exist as software program(s) comprised of program instructions in source code, object code, executable code or other formats for performing some of the steps. Any of the above may be embodied on a computer-readable medium, which may include storage devices and signals, in compressed or uncompressed form.

As used herein, the term "computer" refers to any electronic device comprising a processor, such as a general-purpose central processing unit (CPU), a specific-purpose processor or a microcontroller. A computer is capable of receiving data (an input), of performing a sequence of predetermined operations thereupon, and of producing thereby a result in the form of information or signals (an output). Depending on the context, the term "computer" will mean either a processor in particular or more generally a processor in association with an assemblage of interrelated elements contained within a single case or housing.

The term "processor" or "processing unit" refers to a data processing circuit that may be a microprocessor, a co-processor, a microcontroller, a microcomputer, a central processing unit, a field programmable gate array (FPGA), a programmable logic circuit, and/or any circuit that manipulates signals (analog or digital) based on operational instructions that are stored in a memory. The term "memory" refers to a storage circuit or multiple storage circuits such as read-only memory, random access memory, volatile memory, non-volatile memory, static memory, dynamic memory, Flash memory, cache memory, and/or any circuit that stores digital information.

As used herein, a "computer-readable medium" or "storage medium" may be any means that can contain, store, communicate, propagate, or transport a computer program for use by or in connection with the instruction execution system, apparatus, or device. The computer-readable medium may be, for example but not limited to, an electronic, magnetic, optical, electromagnetic, infrared, or semiconductor system, apparatus, device, or propagation medium. More specific examples (non-exhaustive list) of the computer-readable medium may include the following: an electrical connection having one or more wires, a portable computer diskette, a random access memory (RAM), a read-only memory (ROM), an erasable programmable read-only memory (EPROM or Flash memory), an optical fiber, a portable compact disc read-only memory (CDROM), a digital versatile disc (DVD), a Blu-ray disc (BD), and a memory card.

It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Furthermore, it is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SIGNS

100 method for facilitating a relative position determination
102 a first RF communication device measures a first angle of arrival, which is an angle of arrival of a first RF signal received from a second RF communication device
104 the first RF communication device senses its orientation a first time, resulting in a first orientation 106 the first RF communication device measures a second angle of arrival, which is an angle of arrival of a second RF signal received from the second RF communication device
108 the first RF communication device senses its orientation a second time, resulting in a second orientation
110 the relative position of the second RF communication device with respect to the first RF communication device is determined using the difference between the first angle of arrival and the second angle of arrival and the difference between the first orientation and the second orientation
200 RF communication device
202 angle-of-arrival measurement unit
204 orientation sensor
206 processing unit
300 RF communication device
400 system for facilitating a relative position determination
402 phone 1
404 phone 2
406 phone 2'
500 system for facilitating a relative position determination
502 phone 1
504 phone 2
506 phone 2'
508 system for facilitating a relative position determination
600 method for facilitating a relative position determination
602 a first RF communication device measures a first angle of arrival, which is an angle of arrival of a first RF signal received from a second RF communication device
604 the first RF communication device senses its orientation, resulting in a first orientation
606 the second RF communication device measures a second angle of arrival, which is an angle of arrival of an RF signal received from the first RF communication device
608 the second RF communication device senses its orientation, resulting in a second orientation
610 the relative position of the second RF communication device with respect to the first RF communication device is determined using the difference between the first angle of arrival and the second angle of arrival and the difference between the first orientation and the second orientation
700 system for facilitating a relative position determination
702 phone 1
704 phone 2
706 phone 2'

The invention claimed is:

1. A method for facilitating a relative position determination, comprising:
a first radio frequency, RF, communication device measures a first angle of arrival, being an angle of arrival of a first RF signal received from a second RF communication device;
the first RF communication device senses its orientation at a first time, resulting in a first orientation;
the first RF communication device measures a second angle of arrival, being an angle of arrival of a second RF signal received from the second RF communication device;
the first RF communication device senses its orientation at a second time, resulting in a second orientation;
the relative position of the second RF communication device with respect to the first RF communication device is determined using a difference between the first angle of arrival and the second angle of arrival and a difference between the first orientation and the second orientation; and
wherein the difference between the first angle of arrival and the second angle of arrival is correlated with the difference between the first orientation and the second orientation, and wherein the first angle of arrival is confirmed if the result of said correlation matches an expected correlation result.

2. The method of claim 1, wherein the first angle of arrival and the first orientation are measured, respectively sensed, at substantially the same time, and wherein the second angle of arrival and the second orientation are measured, respectively sensed, at substantially the same time.

3. The method of claim 1, further comprising requesting a user to change the orientation of the first RF device after the first RF communication device has sensed its orientation the first time.

4. The method of claim 1, wherein the first orientation and the second orientations are absolute orientations or relative orientations.

5. The method of claim 1, wherein the first orientation and the second orientation are sensed by an angular rate sensor of the first RF communication device.

6. The method of claim 5, wherein the angular rate sensor is included in an inertial measurement unit of the first RF communication device.

7. The method of claim 1, wherein the first and second RF communication devices are ultra-wideband, UWB, communication devices, Bluetooth communication devices, Zigbee communication devices, or Wi-Fi communication devices.

8. A computer program comprising computer-executable instructions stored on a non-transitory computer readable medium that, when executed by a processor, carry out or control the method of claim 1.

9. A radio frequency, RF, communication device, comprising:
a measurement unit configured to measure an angle of arrival of RF signals received from an external RF communication device;
a sensor configured to sense the orientation of the RF communication device;
a processing unit;
wherein the measurement unit is configured to measure a first angle of arrival and a second angle of arrival;
wherein the sensor is configured to sense a first orientation and a second orientation;
wherein the processing unit is configured to determine the relative position of the second RF communication device with respect to the first RF communication device using a difference between the first angle of arrival and the second angle of arrival and a difference between the first orientation and the second orientation; and
wherein the processing unit is configured to correlate the difference between the first angle of arrival and the second angle of arrival with the difference between the first orientation and the second orientation, and wherein the first angle of arrival is confirmed if the result of said correlation matches an expected correlation result.

10. The device of claim 9, wherein the device comprises one of an ultra-wideband, UWB, communication device, Bluetooth communication device, Zigbee communication device, or Wi-Fi communication device.

11. A method for facilitating a relative position determination, comprising:

a first radio frequency, RF, communication device measures a first angle of arrival, being an angle of arrival of an RF signal received from a second RF communication device;

the first RF communication device senses its orientation, resulting in a first orientation;

the second RF communication device measures a second angle of arrival, being an angle of arrival of an RF signal received from the first RF communication device;

the second RF communication device senses its orientation, resulting in a second orientation;

the relative position of the second RF communication device with respect to the first RF communication device is determined using a difference between the first angle of arrival and the second angle of arrival and a difference between the first orientation and the second orientation; and wherein the difference between the first angle of arrival and the second angle of arrival is correlated with the difference between the first orientation and the second orientation, and wherein the relative position of the second RF communication device with respect to the first RF communication device is determined if the result of said correlation matches an expected correlation result.

12. The method of claim 11, wherein the first angle of arrival and the first orientation are measured, respectively sensed, at substantially the same time, and wherein the second angle of arrival and the second orientation are measured, respectively sensed, at substantially the same time.

13. The method of claim 11, wherein the first orientation and the second orientations are absolute orientations.

14. The method of claim 11, wherein the first orientation and the second orientation are sensed by an angular rate sensor of the first RF communication device, respectively an angular rate sensor of the second RF communication device.

15. A computer program comprising computer-executable instructions stored on a non-transitory computer readable medium that, when executed by a processor, carry out or control the method of claim 11.

16. The method of claim 11, wherein the first and second RF communication devices are ultra-wideband, UWB, communication devices, Bluetooth communication devices, Zigbee communication devices, or Wi-Fi communication devices.

* * * * *